United States Patent
Eggert et al.

(10) Patent No.: US 10,302,202 B2
(45) Date of Patent: May 28, 2019

(54) VALVE WITH A CERAMIC DISC

(71) Applicant: Siemens Schweiz AG, Zurich (CH)

(72) Inventors: Dominik Eggert, Zurich (CH); Joerg Evertz, Birmensdorf (CH)

(73) Assignee: SIEMENS SCHWEIZ AG, Zurich (CH)

( * ) Notice: Subject to any disclaimer, the term of this patent is extended or adjusted under 35 U.S.C. 154(b) by 11 days.

(21) Appl. No.: 15/407,984

(22) Filed: Jan. 17, 2017

(65) Prior Publication Data
US 2017/0204977 A1 Jul. 20, 2017

(30) Foreign Application Priority Data
Jan. 18, 2016 (EP) .................................... 16151761

(51) Int. Cl.
| | |
|---|---|
| F16K 1/42 | (2006.01) |
| F16K 27/02 | (2006.01) |
| F16K 3/20 | (2006.01) |
| F16K 25/00 | (2006.01) |
| F16K 1/46 | (2006.01) |

(52) U.S. Cl.
CPC .............. *F16K 1/42* (2013.01); *F16K 1/46* (2013.01); *F16K 25/005* (2013.01); *F16K 27/02* (2013.01); *F16K 3/20* (2013.01)

(58) Field of Classification Search
CPC . F16K 1/42; F16K 1/40; F16K 25/005; F16K 27/02; F16K 1/427; F16K 3/00; F16K 3/20; F16K 3/202; F16K 3/205
USPC ................. 251/328, 326, 359, 363
See application file for complete search history.

(56) References Cited

U.S. PATENT DOCUMENTS 5,341,835 A * 8/1994 Lanning, II ........... F16K 3/0227
137/246.22
5,577,707 A * 11/1996 Brida ....................... F16K 3/20
251/159

FOREIGN PATENT DOCUMENTS

| DE | 2113904 A1 | 9/1972 | ............ F16K 11/065 |
| DE | 2352477 A1 | 4/1975 | ............ F16K 11/065 |
| DE | 102008017099 A1 | 10/2009 | ............... F16K 3/20 |
| DE | 102009016672 A1 | 10/2010 | ............. B62D 65/00 |
| EP | 2444702 A1 | 4/2012 | ............ F16K 11/065 |
| FR | 2528933 A1 | 12/1983 | ............ F16K 11/065 |
| JP | 11109052 A | 4/1999 | ............. G04B 37/08 |

OTHER PUBLICATIONS

European Office Action, Application No. 16151761.0, 5 pages, dated Jul. 14, 2016.

* cited by examiner

*Primary Examiner* — Kevin Murphy
*Assistant Examiner* — Kelsey Cary
(74) *Attorney, Agent, or Firm* — Slayden Grubert Beard PLLC (57) ABSTRACT

A valve assembly for modulating flow of a fluid through a valve may include a plunger, a flange with an orifice, a first disc with an orifice, a second disc, a gasket in contact with both the flange and the first disc, three bearing members disposed between the first disc and the flange. The three bearing members define a position and orientation of the first disc with respect to the flange, and separate the first disc from the flange, thereby defining a gap between the flange and said disc. The plunger displaces the second disc surfaces from a first position to a second position.

14 Claims, 3 Drawing Sheets

FIG. 3c

VALVE WITH A CERAMIC DISC

CROSS-REFERENCE TO RELATED APPLICATIONS

This application claims priority to EP Application No. 16151761.0 filed Jan. 18, 2016, the contents of which are hereby incorporated by reference in their entirety.

TECHNICAL FIELD

The present disclosure relates to a valve with at least one ceramic disc. More particularly, the present disclosure focuses on an arrangement of a ceramic disc inside a housing of a valve. The present disclosure also relates to a circuit for heating, cooling, air-conditioning and/or ventilation comprising a valve with a ceramic disc.

BACKGROUND

Valves employ ceramic discs as valve elements and/or as shut-off elements. Other uses of ceramic discs inside valves include, but are not limited to, throttle elements, elements for regulation or control of gaseous flow or liquid flow, mixing or diverting elements etc. These valves commonly comprise a metallic or a polymeric housing.

The German patent application DE102008017099A1 discloses a valve element with two valve plates 3a, 3b. The valve plates 3a, 3b are arranged perpendicular to flow path through the valve. FIG. 1 of DE102008017099A1 shows U-shaped valve plates 3a, 3b that may slide in opposite directions.

The German patent application DE102008017099A1 teaches in par 12 flange inserts 9 that are made of metal or of plastics. DE102008017099A1 does not teach the use of ceramics in valves. The application does, in particular, not deal with difficulties due to parts such as housings and throttle elements that are made of different materials.

Difficulties due to gaskets made of different materials are, however, known from various other technical fields such as wristwatches. The Japanese patent application JP19970269073 teaches a watch wherein a glass cover 203 is mounted on a packing 300. The arrangement of JP19970269073 employs a gasket 100 to obtain a wristwatch that is waterproof and dustproof.

The European patent application EP2444702A1 discloses a valve with fixed disc 21 and with a moving disc 30. The moving disc 30 can be arranged both upstream and downstream of the fixed disc 21. In accordance with par 33, the surfaces discs 21 and 30 abut one another in order to achieve fluid-tightness.

A fluid-tight arrangement requires the abutting surfaces of the discs 21 and 30 to be planar or substantially planar. To provide surfaces of ceramic discs that meet those requirements, the surfaces are typically grinded and/or polished during manufacture.

The arrangement comprises bearings 40, 41 that connect the moving disc 30 to a channel 24. FIG. 3 of EP2444702A1 depicts bearings 40, 41 that are ball-shaped. The connection between the moving disc 30 and the channel 24 also impacts on fluid-tightness, since the bearings 40, 41 transfer strains from the second channel 24 to the disc 30. The second channel 24 may, for instance, be strained as a result of thermal stresses or as a result of pressures inside and outside the valve.

To come up with a fluid-tight gasket between the discs 21 and 30, those strains need to be reduced to a minimum. The surface of the disc 30 in contact with the disc 21 and the opposite surface of the disc 30 in contact with the bearings 40, 41 require polishing. The requirement of ceramic discs with planar or with substantially planar surfaces adds to the cost of the valve. In addition, the ceramic material needs to be stiff in order to ensure minimum strains of the disc 30.

SUMMARY

One embodiment provides a valve assembly for modulating flow of a fluid through a valve, the valve assembly comprising: a flange with an orifice, a first disc with an orifice, at least a plunger, and a second disc connected to the at least a plunger; a gasket in between the flange and the first disc, the gasket being in contact with the flange and in contact with the first disc; wherein the gasket forms a closed loop; the valve assembly further comprising three bearing members interposed between the first disc and the flange; wherein the three bearing members define the position and the orientation of the first disc with respect to the flange; wherein the three bearing members separate the first disc from the flange, thereby defining a gap between the flange and said disc; and the valve assembly comprising a fluid path connecting the orifice of the flange via the gap between the flange and the first disc to the orifice of the first disc; wherein said fluid path has a portion inside said gap; wherein the gasket seals said portion of the fluid path such that any fluid flow into and/or out of said portion is required to flow through at least one of the orifices; wherein the first disc and the second disc each provide surfaces in mutual abutment; wherein the at least a plunger is configured to displace the second disc along said mutually abutting surfaces from a first position to a second position; wherein the second disc in its first position covers the orifice of the first disc thereby obturating fluid flow along said fluid path; and wherein the second disc in its second position at least partially uncovers the orifice of the first disc thereby enabling fluid flow along said fluid path.

In one embodiment, the three bearing members protrude from the first disc and wherein at least one of the bearing members is in permanent contact with the flange.

In one embodiment, the three bearing members protrude from the flange and wherein at least one of the bearing members is in permanent contact with the first disc.

In one embodiment, the three bearing members protrude from the first disc and/or wherein at least one of the bearing members is not joined, preferably not permanently joined, to the flange.

In one embodiment, the three bearing members protrude from the flange and/or wherein at least one of the bearing members is not joined, e.g., not permanently joined, to the first disc.

In one embodiment, at least one of the discs is made of ceramics, preferably of engineering ceramics, yet more preferably of silicon carbide and/or of aluminum oxide.

In one embodiment, both of the discs are made of ceramics, preferably of engineering ceramics, yet more preferably of silicon carbide and/or of aluminum oxide.

In one embodiment, the mutually abutting surfaces of the first disc and of the second disc are planar or substantially planar.

In one embodiment, the first disc is a fixed disc and is not configured to be displaced with respect to the flange.

In one embodiment, the plunger is configured to displace, e.g., to continuously displace, the second disc along said mutually abutting surfaces from a first position to a third position, wherein the second disc in its third position completely uncovers the orifice of the first disc thereby fully enabling fluid flow along said fluid path.

Another embodiment provides a valve comprising at least an inlet and at least an outlet and a fluid path connecting the at least an inlet to the at least an outlet, the valve also comprising at least a valve assembly as disclosed above, wherein the at least a valve assembly is arranged in the fluid path between the at least an inlet of the valve and the at least an outlet of the valve.

In one embodiment, the at least an inlet of the valve and the at least an outlet of the valve define a direction of fluid flow such that the at least an inlet is arranged upstream of the at least an outlet, wherein the second disc of the at least a valve assembly is arranged upstream of the first disc of the at least a valve assembly.

In one embodiment, the at least an inlet of the valve and the at least an outlet of the valve define a direction of fluid flow such that the at least an outlet is arranged downstream of the at least an inlet, wherein the second disc of the at least a valve assembly is arranged downstream of the first disc of the at least a valve assembly.

Another embodiment provides a circuit for heating, cooling, air-conditioning and/or ventilation with at least a valve as disclosed above.

Another embodiment provides an apparatus with at least a fuel cell and with at least a valve as disclosed above, wherein the at least a valve is configured to modulate flow of a fluid to and/or from the at least a fuel cell.

BRIEF DESCRIPTION OF THE DRAWINGS

Example aspects and embodiments of the invention are described below with reference to the drawings, in which.

DETAILED DESCRIPTION

Embodiments of the present disclosure may improve on valves with ceramic discs. For example, embodiments may provide a valve that allows for technical tolerances to be relaxed.

Some embodiments provide a valve with a ceramic disc. A three-point bearing connects the ceramic disc (via a flange) to the housing of the valve. The three bearing points exclusively define the plane of interaction between the housing and the ceramic disc. They thus provide maximum strength and stability to the housing/disc interface. The three-point bearing may transfer rotational and translational modes of motion from the housing to the ceramic disc. The housing does, however, no longer apply (shear-) forces and/or bending forces to the ceramic disc. The three-point bearing thus largely prevents strains from being transferred from the housing to the ceramic disc.

The three-point bearing is disposed between the fixed disc of a valve and a flange of the housing. A mobile disc provides a surface that abuts surface of the fixed disc. The mobile disc may be arranged both upstream and downstream of the fixed (ceramic) disc. Due to the elimination of strains of the fixed disc, fluid-tightness is achieved by providing two discs with (substantially) parallel surfaces.

The above problems may be resolved by an assembly of discs and by a valve assembly as disclosed herein.

In other words, the present disclosure teaches a valve assembly and/or a disc arrangement for a valve for modulating flow of a fluid through a valve, the valve assembly comprising a flange with an orifice, a first disc with an orifice, at least a plunger, and a second disc connected to the at least a plunger, a gasket in between the flange and the first disc, the gasket being in contact with the flange and in contact with the first disc, wherein the gasket forms a closed loop, the valve assembly further comprising three bearing members interposed between the first disc and the flange, wherein the three bearing members define the position and the orientation of the first disc with respect to the flange, wherein the three bearing members separate the first disc from the flange, thereby defining a gap between the flange and said disc, the valve assembly comprising a fluid path connecting the orifice of the flange via the gap between the flange and the first disc to the orifice of the first disc, wherein said fluid path has a portion inside said gap, wherein the gasket seals said portion of the fluid path such that any fluid flow into and/or out of said portion is required to flow through at least one of the orifices, wherein the first disc and the second disc each provide surfaces in mutual abutment, wherein the at least a plunger is configured to displace the second disc along said mutually abutting surfaces from a first position to a second position, wherein the second disc in its first position covers the orifice of the first disc thereby obturating fluid flow along said fluid path, wherein the second disc in its second position at least partially uncovers the orifice of the first disc thereby enabling fluid flow along said fluid path.

Some embodiments provide a valve assembly and/or an arrangement of discs for a valve with a fixed disc and with a mobile disc. The discs are made of ceramic material. The discs are preferably made of engineering ceramics, yet more preferably of aluminum oxide (Al2O3) and/or of silicon carbide (SiC) and/or of zirconium dioxide (ZrO2) and/or of magnesium oxide (MgO). The skilled person chooses a ceramics material such as aluminum oxide with a suitable level of purity such as 92%, 96%, or 99%. Higher levels of purity confer advantages in terms of mechanical stiffness and strength and/or dielectric strength.

Some embodiments provide a valve assembly and/or an arrangement of discs for a valve with a fixed disc and with a mobile disc. A surface of the fixed disc abuts a surface of the mobile disc. These abutting surfaces are grinded and/or polished in order that the interface becomes fluid-tight. Due to the three-point support, only the abutting surface of each disc requires machining and/or polishing.

Other embodiments provide a valve and/or an assembly of discs inside a valve with a three-point support for the ceramic disc. Bearing members are preferably substantially cylindrical in shape. The valve and/or the arrangement of discs could also employ other shapes for bearing members such as spheres, pyramids, cones and/or rectangular bearing members.

Other embodiments provide a valve assembly and/or an assembly of discs for a valve with a sealing gap. The distribution of pressures along the sealing gap shall be as uniform as possible.

Other embodiments provide a valve assembly and/or an assembly of discs for a valve with a first disc and with a second mobile disc. The first disc provides a surface that abuts the surface of the second mobile disc. The interface formed by the abutting surfaces shall be fluid-tight or substantially fluid-tight.

Other embodiments provide a valve assembly and/or an assembly of discs for a valve wherein the discs are ceramic discs and are perpendicular or substantially perpendicular to the flow path through the valve.

Other embodiments provide a circuit for heating, cooling, air-conditioning and/or ventilation that comprises a valve with a ceramic disc in accordance with the instant disclosure.

In some embodiment, the disclosed disc assembly is part of a valve. The valve may provide a housing with at least one inlet and with at least one outlet. A valve according to the instant disclosure also provides a valve element.

Figure 1:
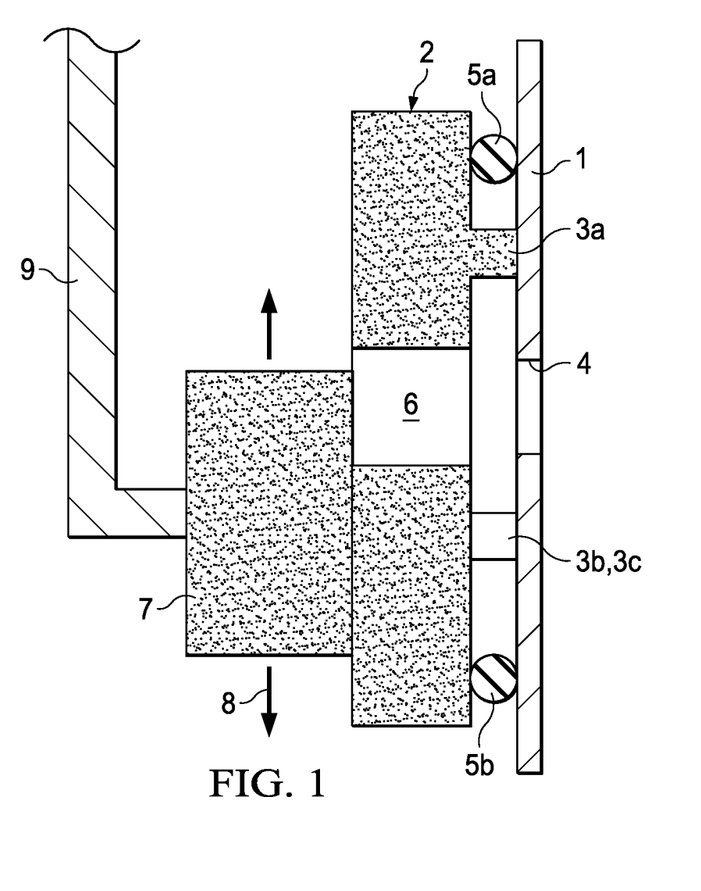
FIG. 1 is a cross-section view of a disc assembly according to the present disclosure.

FIG. 1 shows a valve element of a valve. To that end, the housing of the valve provides a flange 1. A fixed disc 2 is arranged adjacent the flange 1. The fixed disc 2 is made of ceramics, preferably of engineering ceramics, yet more preferably of aluminum oxide (Al2O3) and/or of silicon carbide (SiC) and/or of zirconium dioxide (ZrO2) and/or of magnesium oxide (MgO). The skilled person chooses a ceramics material such as aluminum oxide with a suitable level of purity such as 92%, 96%, or 99%. Higher levels of purity confer advantages in terms of mechanical tightness, mechanical brittleness, and dielectric strength.

In an alternate embodiment, the fixed disc 2 is made of a metallic material such as (stainless) steel or of an aluminum (alloy). The fixed disc 2 is coated with a suitable material such as a ceramics material. The coating is advantageously selected from the above list of ceramics materials.

In other words, the instant disclosure teaches a valve assembly, wherein at least one of the discs 2, 7 is made of ceramics, preferably of engineering ceramics, yet more preferably of silicon carbide and/or of aluminum oxide.

The instant disclosure also teaches a valve assembly wherein the first disc 2 is a fixed disc 2. The fixed disc 2 is (substantially) immobile with respect to the flange 1. The skilled person understands that even a fixed disc 2 has limited play due to the support members 3a, 3b, 3c.

The instant disclosure further teaches a valve assembly, wherein both of the discs 2, 7 are made of ceramics, preferably of engineering ceramics, yet more preferably of silicon carbide and/or of aluminum oxide.

Three support members 3a, 3b, 3c are interposed between the fixed disc 2 and the flange 1. FIG. 1 shows a first support member 3b behind another support member 3c. Accordingly, FIG. 1 depicts the support members 3b, 3c as a single structure. Both of the support elements are disposed underneath the orifice 4 of the flange 1. The cross-section of the orifice 4 can, by way of non-limiting example, be circular, rectangular, elliptical, triangular etc The support members 3a, 3b, 3c are preferably substantially cylindrical in shape. The assembly could also employ support members 3a, 3b, 3c with other shapes such as spheres, pyramids, cones and/or rectangular support members. The support members 3a, 3b, 3c preferably have the same (or similar) shape. In an alternate embodiment, the support members 3a, 3b, 3c differ in shape. Support member 3a could, by way of non-limiting example, be cylindrical whereas support members 3b, 3c could be conical.

The support members 3a, 3b, 3c are preferably integral with the fixed disc 2. That is, the support members 3a, 3b, 3c protrude from the fixed disc 2 and are made of technical ceramics as detailed above. The bearing members 3a, 3b, 3c are commonly not (permanently) joined to the surface of the flange 1.

In other words, the present disclosure teaches a valve assembly, wherein the three bearing members 3a, 3b, 3c protrude from the first disc 2 and wherein at least one of the bearing members 3a, 3b, 3c is in permanent contact with the flange 1.

The present disclosure also teaches a valve assembly, wherein the three bearing members 3a, 3b, 3c protrude from the flange 1 and wherein at least one of the bearing members 3a, 3b, 3c is in permanent contact with the first disc 2.

The present disclosure further teaches a valve assembly, wherein the three bearing members 3a, 3b, 3c protrude from the first disc 2 and/or wherein at least one of the bearing members 3a, 3b, 3c is not joined, preferably not permanently joined, to the flange 1.

The present disclosure still further teaches a valve assembly, wherein the two bearing members 3b, 3c protrude from the flange 1 and wherein one bearing member 3a protrudes from the first disc 2.

The present disclosure still further teaches a valve assembly, wherein the three bearing members 3a, 3b, 3c protrude from the flange 1 and/or wherein at least one of the bearing members 3a, 3b, 3c is not joined, preferably not permanently joined, to the first disc 2.

The present disclosure still further teaches a valve assembly, wherein the one bearing members 3c protrudes from the flange 1 and wherein two bearing member 3a, 3b protrude from the first disc 2.

The present disclosure further teaches a valve assembly, wherein the three bearing members 3a, 3b, 3c protrude from the first disc 2 and/or wherein at least one of the bearing members 3a, 3b, 3c is not joined, preferably not permanently joined, to the flange 1.

In an alternate embodiment, the support members 3a, 3b, 3c protrude from the flange 1. The support members 3a, 3b, 3c are integral with the flange 1. The bearing members 3a, 3b, 3c are commonly not (permanently) joined to the surface of the fixed disc. The support members 3a, 3b, 3c and/or the flange 1 could, by way of non-limiting example, be made of steel, typically of stainless steel or of plastics. In a particular embodiment, the support members 3a, 3b, 3c and/or the flange 1 are made of ferritic steel. In another special embodiment, the support members 3a, 3b, 3c and/or the flange 1 are made of austenitic steel.

Figure 3A:
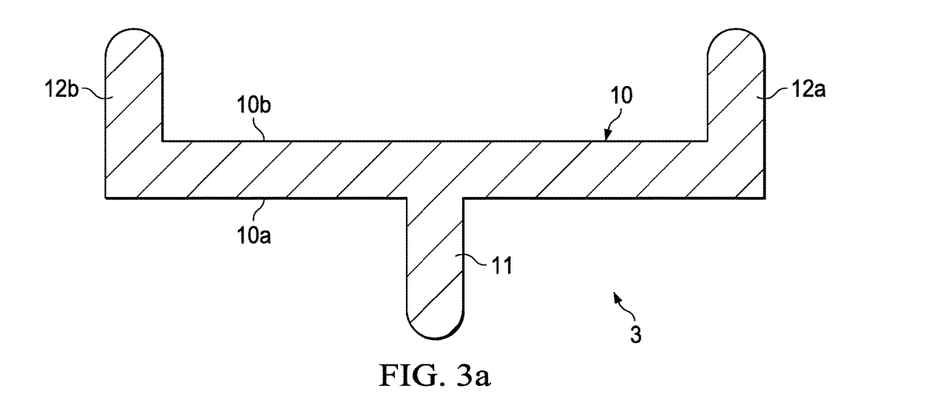
FIG. 3a is a cross-section view of a bearing member with a rocker.

According to an aspect, at least one of the bearing members 3a, 3b, 3c comprises a rocker. Support members 3a, 3b, 3c with pivotally mounted rockers are disclosed in claim 1 and FIG. 2 of DE102009016672A1. FIG. 3a is a cross-section view of a support member 3 with a rocker 10. A support beam 11 protrudes from a first surface 10a of the rocker 10. The support beam 11 advantageously protrudes from or near the center of the rocker 10. The support beam 11 is typically arranged perpendicular or substantially perpendicular to the rocker 10.

Two end arms 12a, 12b protrude from a second surface 10b opposite to the first surface 10a. The end arms 12a, 12b are preferably arranged perpendicular or substantially perpendicular to the rocker 10. Each of the arms 12a, 12b is advantageously arranged at or near an end of the rocker 10.

Figure 3B:
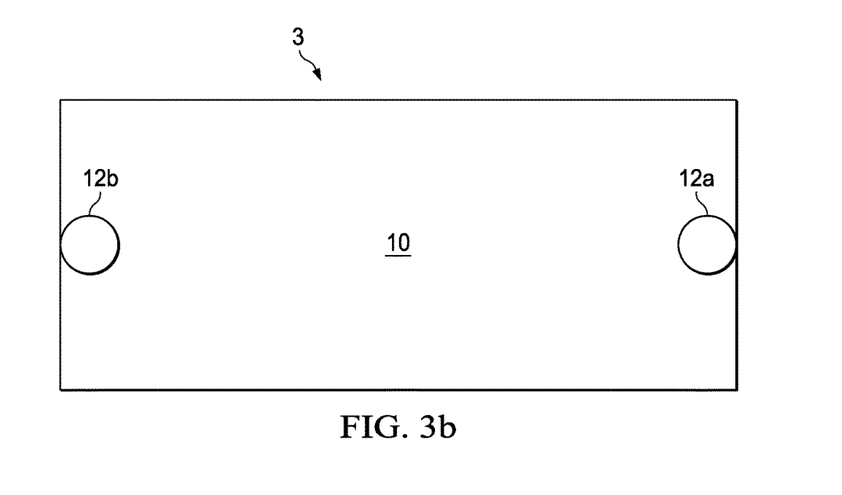
FIG. 3b is a plan view of a bearing member with a rocker.
Figure 3C:
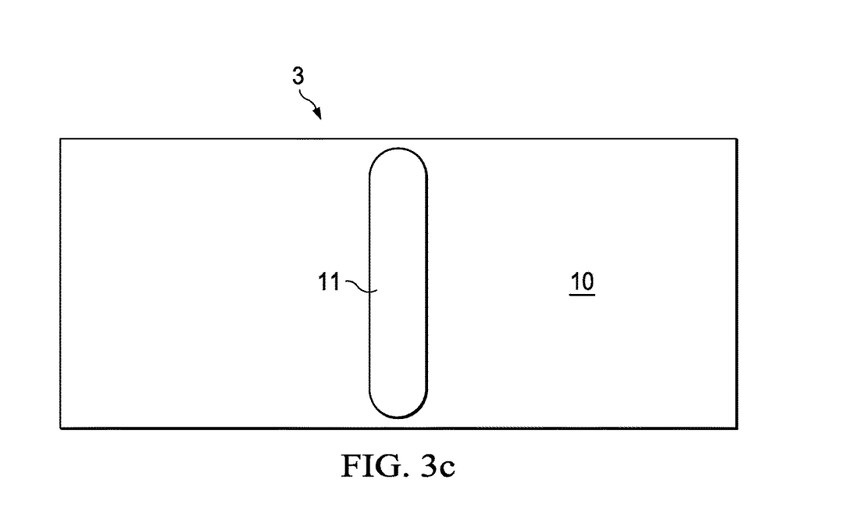
FIG. 3c is another plan view of a bearing member with a rocker.

FIG. 3b is a plan view of the support member 3 in the direction of the first surface 10b. FIG. 3b shows that the two end arms 12a, 12b are disposed near opposite ends of the rocker 10. FIG. 3c is another plan view of the support member in the direction of the second surface 10a. FIG. 3c shows that the support beam 11 is disposed at or near the center of the rocker 10. It is envisaged that the end arms 12a, 12b and the support beam 11 are integral with the rocker 10.

A bearing member 3 as shown on FIGS. 3a-3c can be interposed between the discs 1, 2 of the assembly. The support beam 11 then abuts a first disc 1,2 and the end arms abut a second disc 2,1. Due to the support beam 11, the rocker 10 can rotate to some extent. The rocker 10 eventually assumes a position that is a function of the positions of the other bearing members.

According to another aspect, two bearing members 3 with rockers 10 are interposed between the discs 2, 1. According to yet another aspect, three bearing members 3 with rockers 10 are interposed between the discs 2, 1.

In other words, the instant disclosure teaches a valve assembly for modulating flow of a fluid through a valve, wherein at least one bearing member 3a, 3b, 3c comprises a rocker 10.

The instant disclosure teaches a valve assembly for modulating flow of a fluid through a valve, wherein at least one bearing member 3a, 3b, 3c comprises a rocker 10 and a support beam 11 protruding from the rocker 10.

A gasket 5a, 5b is arranged in between the flange 1 and the fixed disc 2. The gasket 5a, 5b sits on the flange 1 and also sits on the fixed disc 2. The gasket 5a, 5b forms a closed loop. The gasket 5a, 5b surrounds the support members 3a, 3b, 3c. In a particular embodiment, the gasket 5a, 5b is an O-ring.

In a particular embodiment, the flange 1 provides a seat for the gasket 5a, 5b (FIG. 1 depicts no seat). In another embodiment, the fixed disc 2 provides a seat for the gasket 5a, 5b. According to yet another embodiment, both the flange 1 and the fixed disc 2 provide seats for the gasket 5a, 5b. By providing at least one seat, the position of the gasket 5a, 5b relative to the fixed disc 2 and/or relative to the flange 1 is defined.

The skilled person chooses a material impermeable to fluids for the gasket 5a, 5b. It is envisaged that the gasket 5a, 5b is made of rubber, in particular of silicone rubber. According to a special embodiment, the gasket 5a, 5b is made of EPDM rubber (ethylene propylene diene monomer (M-class) rubber).

The skilled person also chooses a gasket 5a, 5b that is compatible with the fluid flowing through the valve. In a particular embodiment, the fluid is a liquid such as water. It is also envisaged to employ fluids such as R-401A, R-404A, R-406A, R-407A, R-407C, R-408A, R-409A, R-410A, R-438A, R-500, or a R-502 blend. According to an alternate embodiment, the fluid is gaseous such as air or a combustible gas.

The gasket 5a, 5b is compressed as the fixed disc 2 presses against the flange 1. The gasket 5a, 5b ensures fluid-tightness of the interface between the fixed disc 2 and the flange 1.

The surface of the flange 1 is not necessarily planar. Also, due to variations in temperature and variations in pressure, the flange 1 may buckle. The three support members 3a, 3b, 3c do not carry changes in shape of the flange 1 over to changes in shape the fixed disc 2. The disc 2 may thus shift or change its orientation due to a flange 1 that buckles. The three support members 3a, 3b, 3c will, however, not transfer any strains or bending moments from the flange 1 to the disc 2.

The distribution of pressures along the gasket 5a, 5b essentially is a function of the dimensions of the support members 3a, 3b, 3c and of the position of the gasket 5a, 5b. It is envisaged that the gasket 5a, 5b is arranged so as to render the distribution of compressive forces along the gasket substantially uniform.

The fixed disc 2 also comprises an orifice 6. The orifice 6 allows for the flow of a fluid through the orifice 6 from one end of the fixed disc 2 to the other end. The orifice 6 is, in particular, arranged such that a fluid may flow through the orifice 4 of the flange 1 and then through the orifice 6 of the fixed disc 2. The cross-section of the orifice 6 can, by way of non-limiting example, be circular, rectangular, elliptical, triangular etc. The three support members 3a, 3b, 3c are arranged such that they surround the orifice 6.

The assembly as shown on FIG. 1 also comprises a mobile disc 7. It is envisaged that the mobile disc 7 is made of the same (ceramic) material as the fixed disc 2. It is also envisaged that the mobile disc 7 can be arranged both upstream and downstream of the fixed disc 2. That is, a fluid may flow through the orifice 4 of the flange 1 and then through the orifice 6 of the fixed disc 2 in the direction of the mobile disc 7. The flow of a fluid may also be directed in the opposite direction.

In an alternate embodiment, the mobile disc 7 is made of a metallic material such as (stainless) steel or of an aluminum (alloy). The fixed disc 2 is coated with a suitable material such as a ceramics material. The coating is advantageously selected from the above list of ceramics materials.

It seems worth mentioning that the mobile disc 7 can actually be a disc assembly made of several parts.

The mobile disc 7 may shift as indicated by the arrow 8. To that end, a plunger 9 connects to the mobile disc 7. The skilled person chooses a suitable material for the plunger 9. The skilled person also suitably connects the plunger 9 to the mobile disc 7. The plunger 9 may, for instance, connect to the mobile disc 7 via an opening in the mobile disc 7 (not shown on FIG. 1).

In other words, the instant disclosure teaches a valve assembly, wherein the plunger 9 is configured to displace, preferably to continuously displace, the second disc 7 along said mutually abutting surfaces from a first position to a third position, wherein the second disc 7 in its third position completely uncovers the orifice 6 of the first disc 2 thereby fully enabling fluid flow along said fluid path.

The present disclosure also teaches the aforementioned valve, wherein the plunger 9 by changing the position of the second disc 7 is operable to continuously modulate flow along said fluid path.

It is envisaged that the plunger 9 connects to an (electro-mechnical) actuator. The actuator thus moves the mobile disc 7 via the plunger 9. The actuator is preferably arranged outside the housing of the valve and the plunger 9 preferably comprises a portion outside the housing. The skilled person chooses a suitable bushing that guides the plunger 9 through the housing. According to an alternate embodiment, an operator may manually shift the plunger 9.

It is also envisaged that the plunger 9 applies a force to the mobile disc 7. That way, the plunger 9 presses against the mobile disc 7 against the fixed disc 2. Likewise, the fixed disc 2 presses against the flange 1. The gasket 5, 5a, 5b in between the flange 1 and the fixed disc 2 is then compressed so as to form a fluid-tight seal.

It is also envisaged that struts (not shown on the FIG. 1) apply a force to the mobile disc 7. The skilled person understands that struts can be mounted to the mobile disc 7 such that they press against the mobile disc 7 against the fixed disc 2. Likewise, the fixed disc 2 presses against the flange 1. The gasket 5, 5a, 5b in between the flange 1 and the fixed disc 2 is then compressed so as to form a fluid-tight seal.

FIG. 1 shows that the mobile disc 7 provides a surface that abuts a surface of the fixed disc 2. The surface of the mobile disc 7 can slide on the surface of the fixed disc 2. The two abutting surfaces of the fixed disc 2 and of the mobile disc 7 are planar or essentially planar. Accordingly, any friction between the abutting surfaces is minimized. The two abutting surfaces form a seal that is fluid-tight. The use of planar surfaces and/or the use of similar materials minimizes friction and wear in between the discs 2, 7.

In other words, the instant disclosure teaches a valve assembly, wherein the mutually abutting surfaces of the first disc and of the second disc are planar or substantially planar.

The plunger 9 is operable to move the mobile disc 7 along the fixed disc 2 in order that the mobile disc 7 closes the orifice 6. The mobile disc 7 and the fixed disc 2 form a valve element and FIG. 1 shows the valve element in its (partially) open position. The plunger 9 closes the valve by moving the mobile disc 7 such that a surface of the mobile disc 7 covers the orifice 6. It is envisaged that the mobile disc 7 applies uniform or substantially uniform pressures along the contour of the orifice 6 as it 7 covers the orifice 6. The mobile disc 7 is thus operable to obturate flow through the valve.

Due to the three-point bearing 3a, 3b, 3c between the flange 1 and the fixed disc 2 no strains are transferred from the flange 1 to the fixed disc 2. That is, the abutting surface of the fixed disc 2 will remain planar even if the flange 1 buckles. A change in the shape of the flange 1 does consequently not impair the fluid-tightness of the interface between the two discs 2, 7.

The plunger 9 and/or the connection between the plunger 9 and the mobile disc 7 require some flexibility. The orientation of the mobile disc 7 may vary as the flange 1 buckles and/or is strained. The three-point bearing 3a, 3b, 3c may then change the orientation and/or the position of the fixed disc 2. The orientation and/or the position of the mobile disc 7 will change together orientation and/or the position of the fixed disc 2. It is envisaged that the plunger 9 and/or its connection to the mobile disc 7 can bend to some extent. In doing so, the plunger 9 and/or its connection to the disc 7 compensate for changes in orientation and/or in position of the disc 7.

Figure 2:
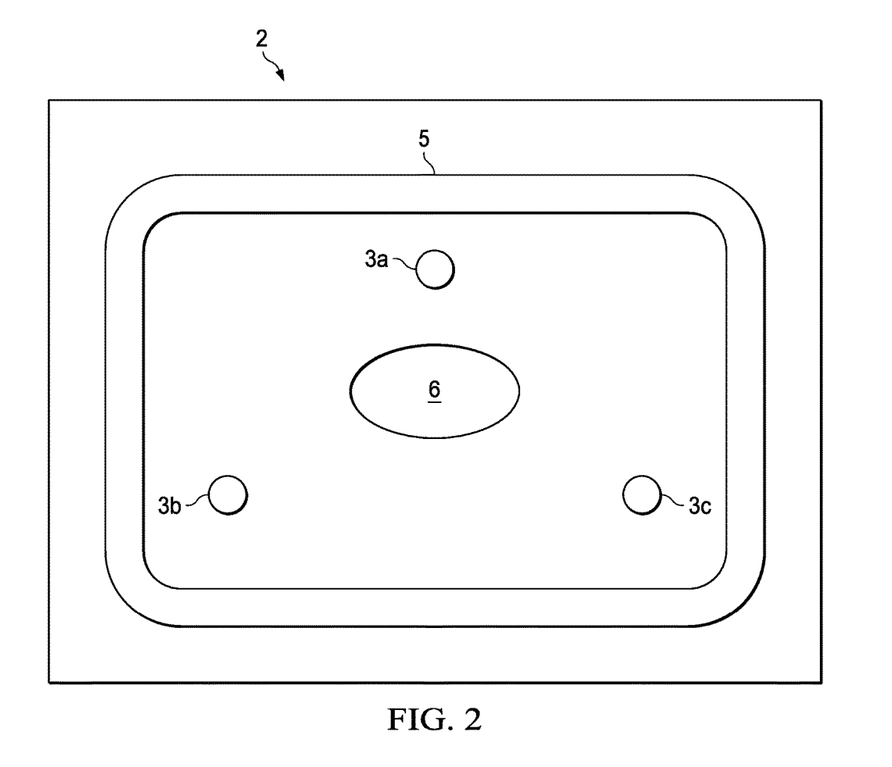
FIG. 2 is a plan view of a fixed disc providing elements for three-point support.

The fixed disc 2 is also shown on FIG. 2. FIG. 2 shows the gasket 5 actually forms a loop that surrounds the support members 3a, 3b, 3c. FIG. 2 also shows the same loop also surrounds the orifice 6 of the fixed disc 2. The three bearing members 3a, 3b, 3c are disposed around the orifice 6.

In an alternate embodiment, the support members 3a, 3b, 3c are arranged outside the gasket 5. It is also envisaged that certain support members 3a, 3b are inside the closed loop formed by the gasket 5 while other support members 3c are outside that loop.

In other words, the instant disclosure teaches a valve comprising at least an inlet and at least an outlet and a fluid path connecting the at least an inlet to the at least an outlet, the valve also comprises at least a valve assembly as disclosed above, wherein the at least a valve assembly is arranged in the fluid path between the at least an inlet of the valve and the at least an outlet of the valve.

It seems worth mentioning that a valve according to the instant disclosure can provide more than one inlet and/or more than one outlet. It is envisaged that a valve according to the instant disclosure comprises two inlets and one outlet. It is also envisaged that a valve according to the instant disclosure comprises one inlet and two outlets.

The instant disclosure also teaches a valve, wherein the at least an inlet of the valve and the at least an outlet of the valve define a direction of fluid flow such that the at least an inlet is arranged upstream of the at least an outlet, wherein the second disc 7 of the at least a valve assembly is arranged upstream of the first disc 2 of the at least a valve assembly.

The instant disclosure further teaches a valve, wherein the at least an inlet of the valve and the at least an outlet of the valve define a direction of fluid flow such that the at least an outlet is arranged downstream of the at least an inlet, wherein the second disc 7 of the at least a valve assembly is arranged downstream of the first disc 2 of the at least a valve assembly.

The instant disclosure teaches a circuit for heating, cooling, air-conditioning and/or ventilation with at least a valve according to instant disclosure.

It is envisaged to employ the valve assembly of the instant disclosure in a valve that modulates flow of a fluid to or from a fuel cell. In a particular embodiment, the fluid is gaseous and/or liquid fuel. In a special embodiment, the fuel cell is a solid oxide fuel cell. In an alternate embodiment, the fuel cell is a polymer electrolyte fuel cell.

In other words, the instant disclosure teaches an apparatus with at least a fuel cell and with at least a valve according to the instant disclosure.

The instant disclosure also teaches an apparatus with at least a fuel cell and with at least a valve according to the instant disclosure, wherein the at least a valve is configured to modulate flow of a fluid to and/or from the at least a fuel cell.

The instant disclosure also teaches an apparatus with at least a cogeneration plant and with at least a valve according to the instant disclosure.

The instant disclosure also teaches an apparatus with at least a cogeneration plant and with at least a valve according to the instant disclosure, wherein the at least a valve is configured to modulate flow of a fluid to and/or from the at least a cogeneration plant.

It should be understood that the foregoing relates only to certain embodiments of the invention and that numerous changes may be made therein without departing the scope of the invention as defined by the following claims. It should also be understood that the invention is not restricted to the illustrated embodiments and that various modifications can be made within the scope of the following claims.

REFERENCE NUMERALS 1 flange (of a valve housing)
2 fixed disc
3, 3a, 3b, 3c support members
4 orifice
5a, 5b gasket
6 orifice
7 mobile disc
8 directions of movement of the mobile disc
9 plunger
10 rocker
10a, 10b second and first surface of the rocker 10
11 support beam
12a, 12b end arms

What is claimed is:

1. A valve assembly for modulating flow of a fluid through a valve, the valve assembly comprising:
 a flange with an orifice,
 a first disc with an orifice,
 at least a plunger,
 a second disc connected to the at least a plunger,
 a gasket arranged between the flange and the first disc, the gasket being in contact with both the flange and the first disc, and wherein the gasket forms a closed loop, three bearing members interposed between the first disc and the flange,
wherein the three bearing members define a position and orientation of the first disc with respect to the flange,
wherein the three bearing members separate the first disc from the flange, thereby defining a gap between the flange and the first disc,
a fluid path connecting the orifice of the flange via the gap between the flange and the first disc to the orifice of the first disc,
wherein the fluid path has a portion inside the gap,
wherein the gasket seals the portion of the fluid path such that any fluid flow into and/or out of the portion flows through at least one of the orifices,
wherein the first disc and the second disc each provide surfaces in mutual abutment,
wherein the at least a plunger is configured to displace the second disc along the mutually abutting surfaces from a first position to a second position,
wherein in the first position the second disc covers the orifice of the first disc thereby obturating fluid flow along the fluid path, and
wherein in the second position the second disc at least partially uncovers the orifice of the first disc thereby enabling fluid flow along the fluid path.

2. The valve assembly according to claim 1, wherein the three bearing members protrude from the first disc, and wherein at least one of the bearing members is in permanent contact with the flange.

3. The valve assembly according to claim 1, wherein the three bearing members protrude from the flange, and wherein at least one of the bearing members is in permanent contact with the first disc.

4. The valve assembly according to claim 1, wherein at least one of (a) the three bearing members protrude from the first disc or (b) at least one of the bearing members is not permanently joined to the flange.

5. The valve assembly according to claim 1, wherein at least one of (a) the three bearing members protrude from the flange or (b) at least one of the bearing members is not permanently joined to the first disc.

6. The valve assembly according to claim 1, wherein at least one of the discs is made of at least one of silicon carbide or aluminum oxide.

7. The valve assembly according to claim 6, wherein each of the first and second discs is made of at least one of silicon carbide or aluminum oxide.

8. The valve assembly according to claim 1, wherein the mutually abutting surfaces of the first and second discs are planar or substantially planar.

9. The valve assembly according to claim 1, wherein the first disc is a fixed disc and is not displaceable with respect to the flange.

10. The valve assembly according to claim 1, wherein the plunger is configured to continuously displace the second disc along the mutually abutting surfaces from the first position to a third position,
wherein in the third position the second disc completely uncovers the orifice of the first disc thereby fully enabling fluid flow along said fluid path.

11. A valve comprising:
a valve inlet,
a valve outlet,
a fluid path connecting the valve inlet to the valve outlet,
a valve assembly comprising:
    a flange with an orifice,
    a first disc with an orifice,
    at least a plunger,
    a second disc connected to the at least a plunger,
    a gasket arranged between the flange and the first disc, the gasket being in contact with both the flange and the first disc, and wherein the gasket forms a closed loop,
    three bearing members interposed between the first disc and the flange,
    wherein the three bearing members define a position and orientation of the first disc with respect to the flange,
    wherein the three bearing members separate the first disc from the flange, thereby defining a gap between the flange and the first disc,
    a fluid path connecting the orifice of the flange via the gap between the flange and the first disc to the orifice of the first disc,
    wherein the fluid path has a portion inside the gap,
    wherein the gasket seals the portion of the fluid path such that any fluid flow into and/or out of the portion flows through at least one of the orifices,
    wherein the first disc and the second disc each provide surfaces in mutual abutment,
    wherein the at least a plunger is configured to displace the second disc along the mutually abutting surfaces from a first position to a second position,
    wherein in the first position the second disc covers the orifice of the first disc thereby obturating fluid flow along the fluid path, and
    wherein in the second position the second disc at least partially uncovers the orifice of the first disc thereby enabling fluid flow along the fluid path,
wherein the a valve assembly is arranged in the fluid path between the valve inlet and valve outlet.

12. The valve according to claim 11, wherein the valve inlet and the valve outlet define a direction of fluid flow such that the valve inlet is arranged upstream of the valve outlet,
wherein the second disc of the valve assembly is arranged upstream of the first disc of the valve assembly.

13. The valve according to claim 11, wherein the valve inlet and the valve outlet define a direction of fluid flow such that the valve outlet is arranged downstream of the valve inlet,
wherein the second disc of the valve assembly is arranged downstream of the first disc of the valve assembly.

14. An apparatus, comprising:
a fuel cell, and
a valve including:
    a flange with an orifice,
    a first disc with an orifice,
    at least a plunger,
    a second disc connected to the at least a plunger,
    a gasket arranged between the flange and the first disc, the gasket being in contact with both the flange and the first disc, and wherein the gasket forms a closed loop,
    three bearing members interposed between the first disc and the flange,
    wherein the three bearing members define a position and orientation of the first disc with respect to the flange,
    wherein the three bearing members separate the first disc from the flange, thereby defining a gap between the flange and the first disc,
    a fluid path connecting the orifice of the flange via the gap between the flange and the first disc to the orifice of the first disc, wherein the fluid path has a portion inside the gap,
wherein the gasket seals the portion of the fluid path such that any fluid flow into and/or out of the portion flows through at least one of the orifices,
wherein the first disc and the second disc each provide surfaces in mutual abutment,
wherein the at least a plunger is configured to displace the second disc along the mutually abutting surfaces from a first position to a second position,
wherein in the first position the second disc covers the orifice of the first disc thereby obturating fluid flow along the fluid path, and
wherein in the second position the second disc at least partially uncovers the orifice of the first disc thereby enabling fluid flow along the fluid path,
wherein the valve is configured to modulate flow of a fluid to and/or from the fuel cell.

* * * * *